(12) United States Patent
Caruso et al.

(10) Patent No.: US 7,123,124 B2
(45) Date of Patent: Oct. 17, 2006

(54) PYROTECHNIC CIRCUIT BREAKER

(75) Inventors: Keith W. Caruso, Oak Park, CA (US); Andrew G. Bonas, Mesa, AZ (US); Abrar A. Tirmizi, Simi Valley, CA (US)

(73) Assignee: Special Devices, Inc., Moorpark, CA (US)

( * ) Notice: Subject to any disclaimer, the term of this patent is extended or adjusted under 35 U.S.C. 154(b) by 147 days.

(21) Appl. No.: 10/688,020

(22) Filed: Oct. 17, 2003

(65) Prior Publication Data

US 2005/0083164 A1    Apr. 21, 2005

(51) Int. Cl.
*H01H 39/00*   (2006.01)
*H01H 37/76*   (2006.01)

(52) U.S. Cl. .................. 337/157; 200/61.08
(58) Field of Classification Search .......... 337/30, 337/157, 401, 405; 361/115; 200/61.08
See application file for complete search history.

(56) References Cited

U.S. PATENT DOCUMENTS

| | | | | |
|---|---|---|---|---|
| 3,803,374 A | * | 4/1974 | Delgendre et al. | 200/61.08 |
| 3,848,100 A | * | 11/1974 | Kozorezov et al. | 200/61.08 |
| 3,885,223 A | * | 5/1975 | Green | 337/406 |
| 3,932,717 A | * | 1/1976 | Dike et al. | 200/61.08 |
| 3,991,649 A | | 11/1976 | Patrichi | 89/1 B |
| 4,150,266 A | * | 4/1979 | Patrichi | 200/61.08 |
| 4,224,487 A | * | 9/1980 | Simonsen | 200/61.08 |
| 4,339,638 A | * | 7/1982 | Lascelles et al. | 200/52 R |
| 4,417,519 A | * | 11/1983 | Lutz | 102/263 |
| 4,603,315 A | * | 7/1986 | Leong et al. | 337/243 |
| 5,535,842 A | * | 7/1996 | Richter et al. | 180/279 |
| 5,725,399 A | | 3/1998 | Albiez et al. | 439/762 |
| 5,783,987 A | * | 7/1998 | Kern et al. | 337/401 |
| 5,818,121 A | | 10/1998 | Krappel et al. | 307/10.7 |
| 5,877,563 A | | 3/1999 | Krappel et al. | 307/10.1 |
| 5,990,572 A | | 11/1999 | Yasukuni et al. | 307/10.1 |
| 6,078,108 A | | 6/2000 | Froschl | 307/10.7 |
| 6,144,111 A | | 11/2000 | Krappel et al. | 307/10.1 |
| 6,166,454 A | | 12/2000 | Schaller et al. | 307/10.1 |
| 6,171,121 B1 | | 1/2001 | Krappel et al. | 439/158 |
| 6,194,988 B1 | | 2/2001 | Yamaguchi et al. | 337/157 |
| 6,222,439 B1 | * | 4/2001 | Tanigawa et al. | 337/401 |
| 6,239,515 B1 | | 5/2001 | Mackel et al. | 307/127 |
| 6,411,190 B1 | | 6/2002 | Yamaguchi et al. | 337/401 |
| 6,417,579 B1 | | 7/2002 | Lehnst et al. | 307/10.7 |
| 6,448,884 B1 | | 9/2002 | Yamaguchi et al. | 337/401 |
| 6,403,420 B1 | | 11/2002 | Takahachi et al. | 337/401 |
| 6,496,098 B1 | | 12/2002 | Kern et al. | 337/401 |
| 6,556,119 B1 | | 4/2003 | Lell | 337/157 |
| 2004/0041682 A1 | | 3/2004 | Pasha et al. | 337/401 |

FOREIGN PATENT DOCUMENTS

DE          20315849          11/2004

* cited by examiner

*Primary Examiner*—Anatoly Vortman
(74) *Attorney, Agent, or Firm*—Law Offices of Thomas J. Brindisi

(57) ABSTRACT

A circuit breaker including a pyrotechnic element configured to ablate or cut a portion of the circuit so as to break the circuit, thereby breaking the circuit. The portion of the circuit to be broken may be specially formed to be readily ablated or cut, and/or may be a current load-based fuse.

16 Claims, 4 Drawing Sheets

PYROTECHNIC CIRCUIT BREAKER

BACKGROUND OF THE INVENTION

The present invention is directed generally to the field of circuit breakers, and more particularly, to a circuit breaker including a pyrotechnic element for breaking the circuit.

The circuit breakers used in various electrical systems in motor vehicles such as automobiles, trucks, buses, fixed wing aircraft, helicopters, marine vessels and the like, have conventionally employed fuse-type resistor elements that burn out when an excessive level of current passes through the element, causing a break in the circuit.

Various substitutes for such conventional fuses have also been devised, such as to permit breaking of a circuit in response to abnormal conditions (such as the collision of a vehicle) that would not necessarily create an immediate excessive current load in a fuse. For example, U.S. Pat. No. 6,194,988 to Yamaguchi et al. teaches the use of a sort of "hot plate" that is spring-biased against a relatively low melting point fuse section, with the hot plate being heated by an attached igniting device that contains a solid combustion agent; the igniting device is rapidly activated such as in the case of a collision, heating the hot plate which then melts the adjacent fuse section and (due to the spring bias) drives through the molten fuse section, cutting it out and thereby breaking the circuit. Devices such as that of the '988 patent based on melting that is induced by conducted heat, however, cannot exploit the rapidity of a pyrotechnic ignition because the process of heat conduction is quite slow in comparison to the speed of a pyrotechnic ignition. Such devices can also be relatively complex and costly.

There are also a number of recent battery cable clamp breaker devices that include a pyrotechnic device (configured to ignite in response to an abnormal condition such as a collision of the vehicle containing the device) that physically drives apart two parts of the clamp or terminal so that they are no longer electrically connected, such as in U.S. Pat. No. 5,725,399 to Albiez et al. and U.S. Pat. Nos. 5,818,121, 6,144,111, and 6,171,121 to Krappel et al. This type of device is generally capable of deploying quickly, e.g., in the case of a collision so as to reduce the chance of an electrical fire in the damaged vehicle irrespective of whether the conditions would rapidly cause a conventional fuse to blow. Yet such devices are in general a relatively complex, costly, and/or bulky way to provide the function of pyrotechnically-induced circuit breaking. Moreover, such devices do not intrinsically involve a conventional (i.e., current load-based) fuse, so if it were desired to also retain the conventional function of current load-based breaking in such a circuit breaker, a conventional fuse would need to be added as a distinct additional component, thus rendering the resulting device yet more complicated and costly.

Finally, U.S. Pat. No. 5,877,563 to Krappel et al. teaches various breaker devices in which a pyrotechnic device is used to propel a cutter(s) through a cable(s) or to unplug a connector(s). The '563 patent, however, does not teach either the direct pyrotechnic ablation of any portion of a circuit, the pyrotechnically-driven cutting of a portion of the circuit that is specially formed to be readily cut, or any kind of pyrotechnically-driven breaking of a current load-based fuse in a circuit. Thus the devices taught in the '563 patent are somewhat complicated, and none includes the function of a conventional current load-based fuse.

SUMMARY OF THE INVENTION

A circuit breaker according to the present invention includes a pyrotechnic igniter and a portion of the circuit that breaks as a result of the ignition of the pyrotechnic igniter.

In a first aspect of the present invention, the portion of the circuit to be broken by the pyrotechnic igniter may be specially formed to receive a direct ablation force from the pyrotechnic igniter, such as for example flattened and/or enlarged in a plane perpendicular to the output of the pyrotechnic igniter. Thus, an intermediate cutting device is not required, permitting an advantageously simplified pyrotechnic circuit breaker to be attained.

In another separate and independent aspect of the invention, the portion of the circuit to be broken by the pyrotechnic igniter may be specially formed to be readily cut in response to an indirect cutting force from the pyrotechnic igniter, such as for example flattened in a plane perpendicular to the output of the pyrotechnic igniter and/or scored. Thus the overall pyrotechnic output force and/or measures to focus that force in order to cut the portion of the circuit are reduced, permitting an advantageously simplified pyrotechnic circuit breaker to be attained.

In yet another separate and independent aspect of the invention, the portion of the circuit to be broken by the pyrotechnic igniter may be a current load-based fuse. Such fuse can be broken either directly through ablation by the output of the pyrotechnic igniter, or indirectly through cutting by a projectile propelled by the output of the pyrotechnic igniter. In this case, the circuit breaker includes two modes of operation, i.e., current load-based breaking, and breaking triggered by an electrical signal to the pyrotechnic igniter; yet the circuit breaker can remain an integrated, unitary device.

DETAILED DESCRIPTION OF PREFERRED EMBODIMENTS

Figure 1:
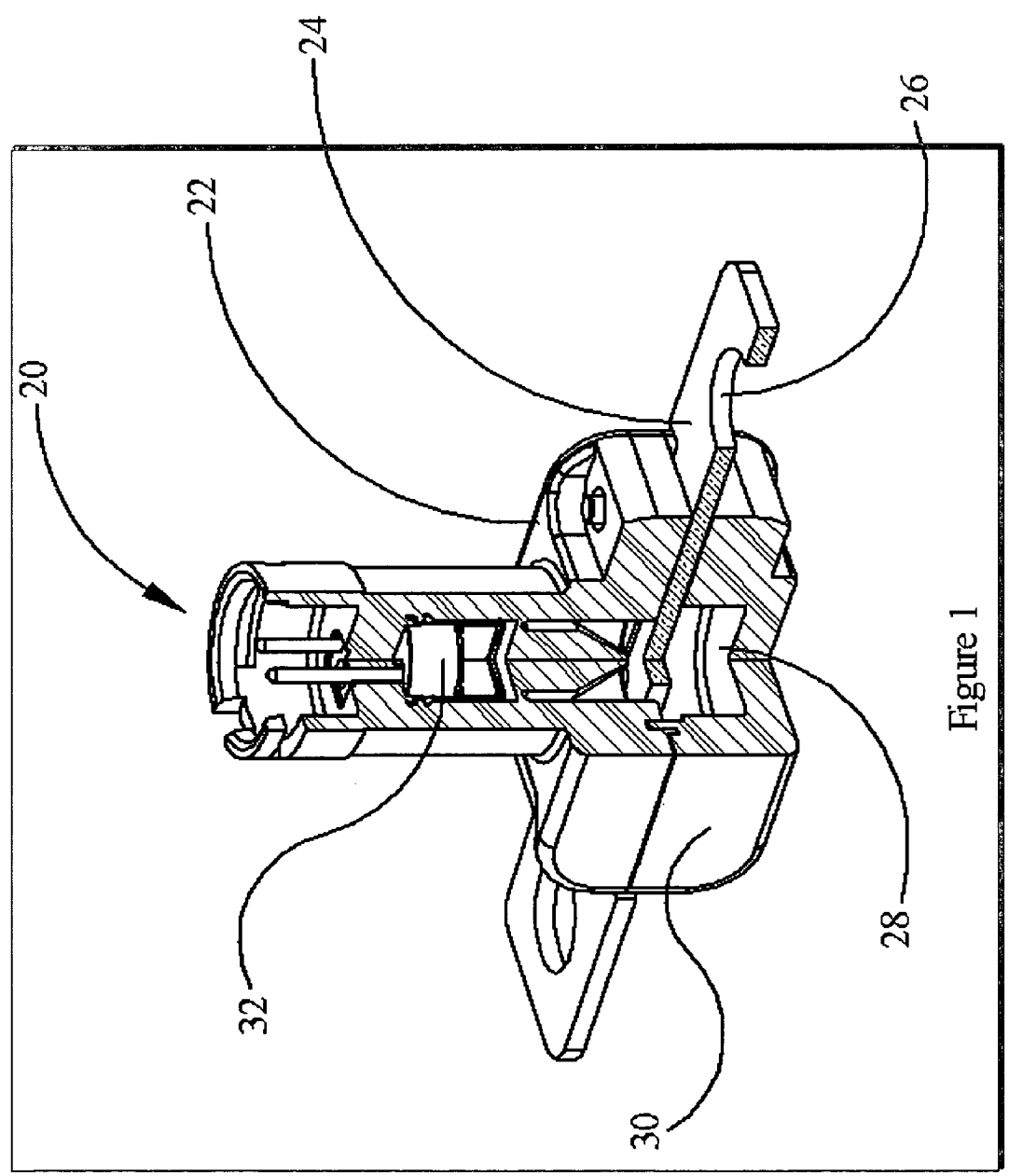
FIG. 1 is a perspective, partly cut-away view of an embodiment of a pyrotechnic circuit breaker according to the present invention, utilizing a cutting projectile.
Figure 2:
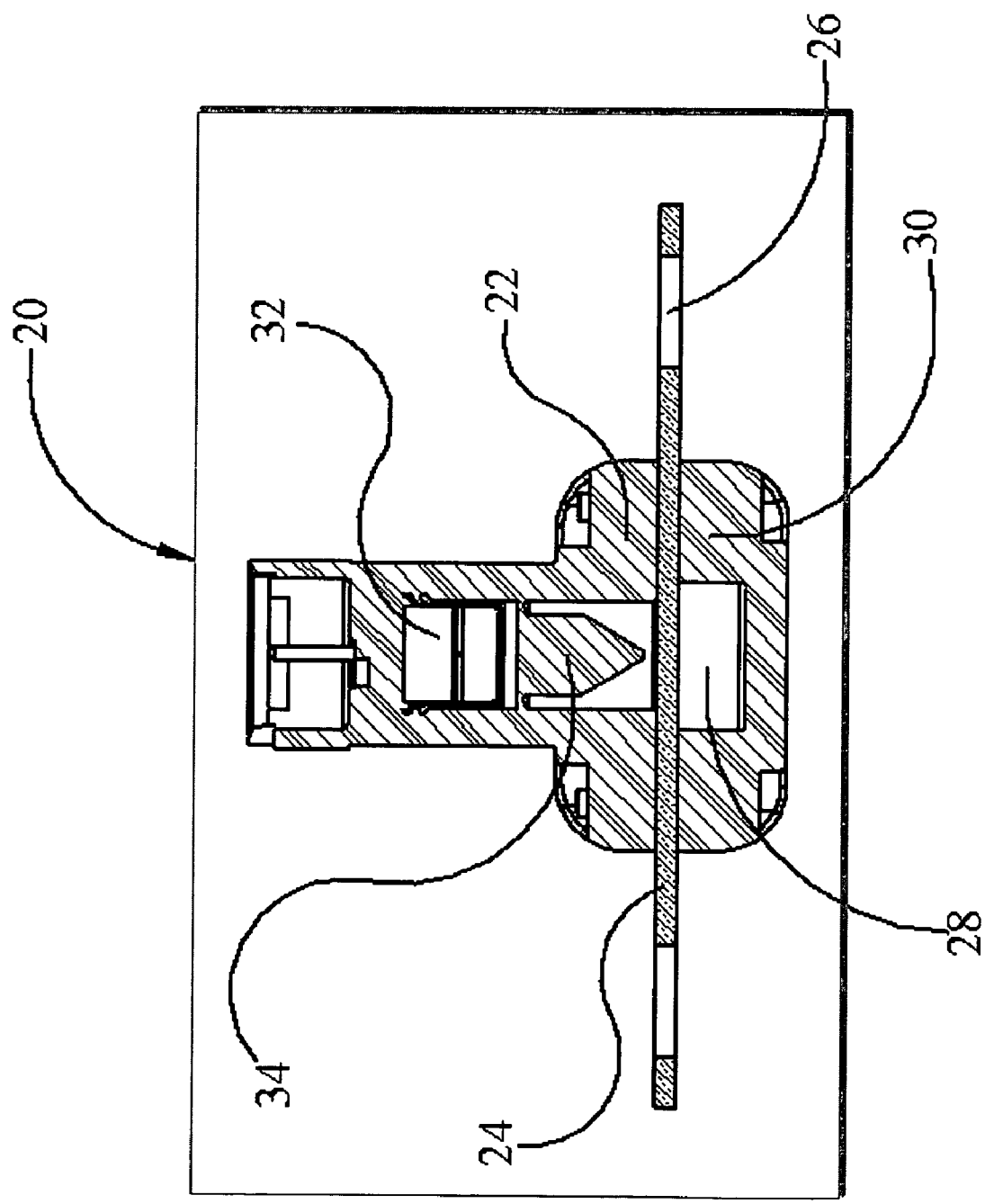
FIG. 2 is a transverse sectional view of the embodiment of FIG. 1.
Figure 3:
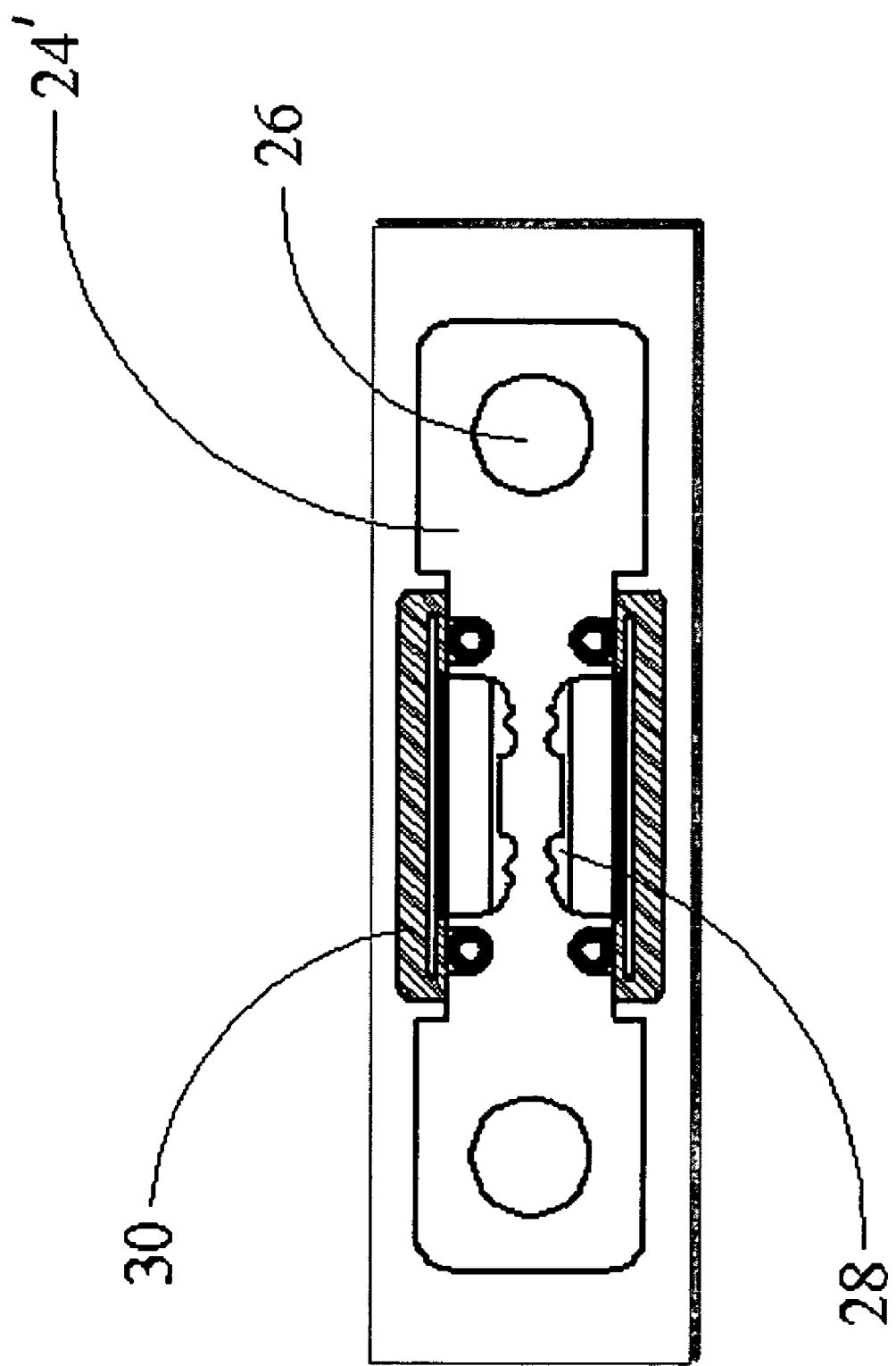
FIG. 3 is a lateral sectional view of another embodiment of a pyrotechnic circuit breaker according to the present invention, not utilizing a cutting projectile, but a focused ignition output.

Referring to FIGS. 1 to 3, a preferred embodiment of a pyrotechnic circuit breaker 20 in accordance with the present invention may include an upper housing 22 and a lower housing 30, which may be made of metal, ceramic, or polymer, preferably a suitable high-strength, high-temperature polymer thermoplastic or thermoset such as Ryton®, Amodel®, Ultem®, Phenolic®, Zytel® and the like. The housing may preferably be constructed as an integral, one-piece, injection molded-in-place housing, preferably created by joining together two or more components. Optionally, a polymer overmolding (preferably selected for beneficial cost, formability, and electrical insulation characteristics) or a superstructure or skeleton of metal may be utilized for added strength. A pyrotechnic igniter assembly 32 is held securely within the upper housing 22, and the portion of the electrical circuit to be broken by the output of the pyrotechnic igniter assembly 32 is situated between the upper housing 22 and the lower housing 30 and may preferably take the form of a bolt-on fuse strip 24 (which includes bolt holes 26 for securing the device to a terminal or the like) (or 24' in FIG. 3). The pyrotechnic igniter assembly 32 may preferably be any suitable reliable, low-cost pyrotechnic device such as an automotive airbag initiator. The pyrotechnic igniter assembly 32 is thus initiated by the issuance of an appropriate electrical signal through its leads, which, for example in the case of an automobile, are preferably connected to the electronic control unit of the automobile's occupant restraint system.

As can be seen, the pyrotechnic igniter assembly 32 is oriented so that its output is directed through a passage to the bolt-on fuse strip 24, generally perpendicularly to the axis of the bolt-on fuse strip 24. Vents (not shown) through either or both halves of the housing may also optionally be provided to safely release the hot gases created by ignition of the pyrotechnic igniter assembly 32. Increasing the diameter of the passage between the pyrotechnic igniter assembly 32 and the bolt-on fuse strip 24 tends to increase the required output of the pyrotechnic igniter assembly 32 and thus may necessitate a stronger housing (both of which tend to increase manufacturing cost); however, the passage's diameter cannot be decreased arbitrarily as that may undesirably reduce the ability of the housing to withstand the flow of high or excessive current through the bolt-on fuse strip 24. The heat tolerance of the housing may be improved so as to permit further reduction of the diameter of the passage, however, such as by forming the housing of a thermoset type polymer, or by adding heat stabilizers or anti-aging additives to a suitable thermoplastic, or by using a cast metal such as zinc or aluminum (although in that case, electrical insulation must be provided between the housing and the fuse).

Optionally (as depicted), a projectile 34 may be provided between the pyrotechnic igniter assembly 32 and the bolt-on fuse strip 24 or other such portion of the electrical circuit that is to be broken, and if so, the projectile 34 can preferably be integrally molded into the upper housing 22 as is shown. Upon ignition of the pyrotechnic igniter assembly 32, the projectile 34 breaks free and is propelled into the bolt-on fuse strip 24, with its pointed front portion facilitating cutting of the bolt-on fuse strip 24. It is noted that the projectile 34 does not necessarily need a point or sharp edge, because the action may primarily be that of shearing the 24 fuse strip. Also, the projectile 34 can made be of the same material as the housing, even if it is polymer, because the action may primarily be a function of the velocity of the projectile 34 rather than its strength. Thus, the projectile 34 may be monolithically molded as part of the housing, eliminating a separate part and the associated cost and scrap, and increasing reliability. In that case, the material connecting the projectile 34 to the rest of the housing preferably may have a cross-section and material strength selected so as to break upon output with enough energy to accelerate the projectile 34 to the velocity required to break the fuse strip 24, and is preferably configured so that an edge is formed upon separation of the projectile 34 from the housing that may provide a seal to the projectile 34 as it travels through the fuse strip 24. When the projectile 34 (which is non-conductive) breaks the fuse strip 24, it pushes the fuse strip 24 into the rupture area 28 (see FIG. 2), preferably locking the broken fuse strip 24 section in place so that it cannot inadvertently re-make the circuit.

Referring to FIG. 2 in particular, it can be seen that a rupture area 28, which is an empty cavity, is provided below the bolt-on fuse strip 24 between the standoff in the sides of the lower housing 30. As noted, the rupture area 28 accommodates the resulting projection of the adjacent portion of the bolt-on fuse strip 24 when impacted by the output of the pyrotechnic igniter assembly 32 or the optional projectile 34. The rupture area 28 can also help reduce the heat conducted into the upper housing 22 and lower housing 30 when the bolt-on fuse strip 24 experiences an excessive current load.

Referring to FIG. 3 in particular, this embodiment reduces ignition charge size for a given sized fuse by focusing ignition gases around the fuse portion to be severed. This increases the local temperature and severs the fuse by applying drag forces across the thickness of the fuse generated by high-speed ignition gases and focused force of the ignition exhaust. The housing is preferably designed to follow the contours of the fuse such that the ignition gases can only pass through a narrow aperture (clearance) around the fuse exerting pressure to break it. The bolt-on fuse strip 24' has a thickness and minimum fuse width that correspond to the rated amperage of the particular fuse, as is known in the art. Bolt-on fuse strips are well-known for use in breaking a circuit under high current override conditions. The output of the pyrotechnic igniter assembly 32, and the configuration of the upper housing 22, lower housing 30, projectile 34 (if any) and rupture area 28, should be designed to accommodate the thickness of whatever fuse may be chosen for use in the circuit breaker, and to ensure reliable breaking of the fuse upon activation of the pyrotechnic igniter assembly 32. Where projectile is not used, the clearance between the periphery of the fuse strip and the adjacent perimeter of the rupture area has a significant effect on the rupturing impact of the pyrotechnic output on the fuse (with less clearance increasing the rupture force exerted). (Although the depicted preferred embodiments utilize a fuse as the portion of a circuit that is formed to be readily broken, which is preferable, it does not necessarily have to be a fuse).

Figure 4:
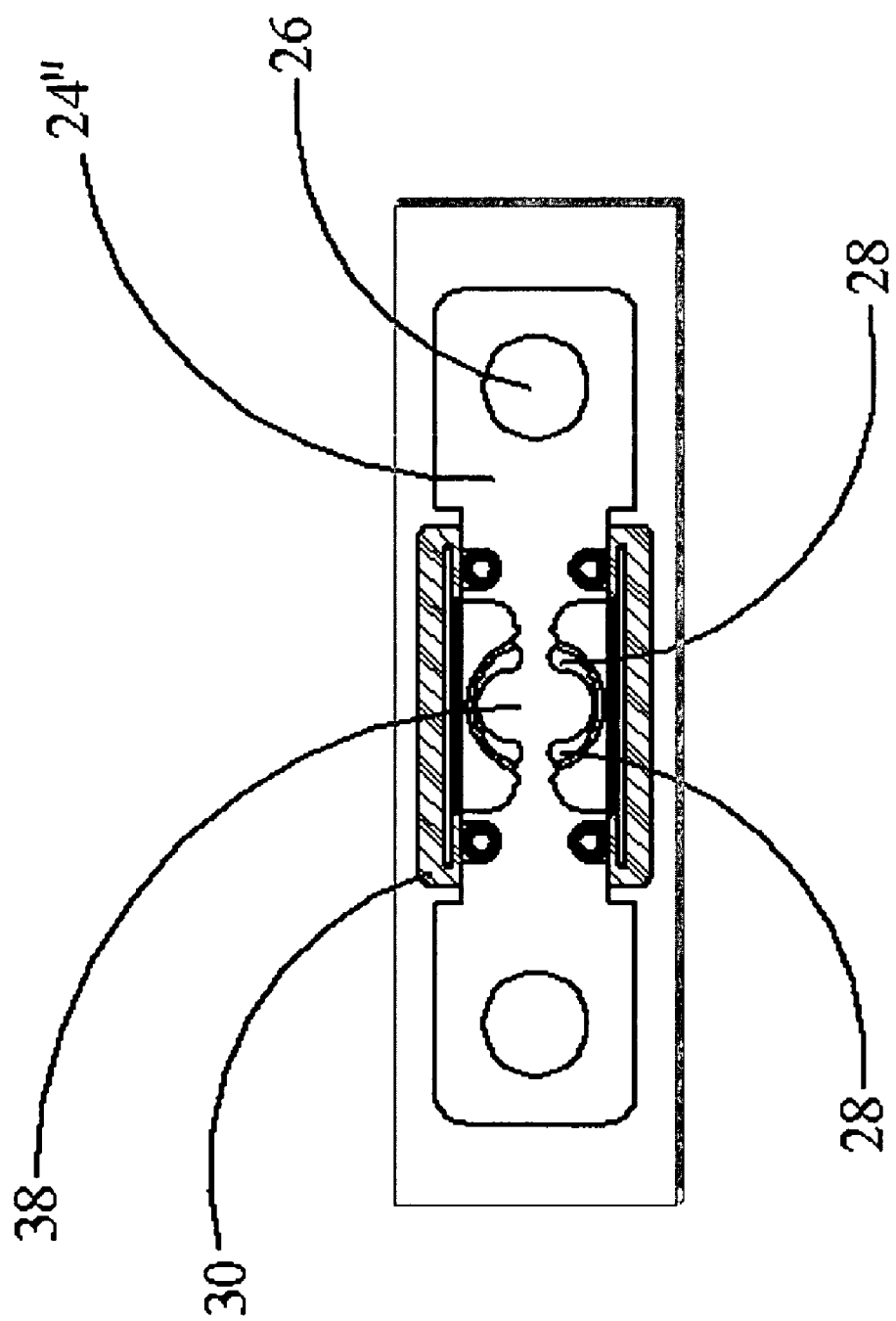
FIG. 4 is a lateral sectional view similar to that of FIG. 3, but depicting an alternative embodiment in which the portion of the circuit to be broken has an enlarged impact area, which may optionally be used with a cutting projectile.

As shown in FIG. 4, an alternate bolt-on fuse strip 24" can be provided with an enlarged impact area 38 that reduces the amount of energy that must be produced by the pyrotechnic igniter assembly 32 in order to ablate or otherwise break the bolt-on fuse strip 24", thus permitting (depending on the embodiment) the use of a lower cost pyrotechnic igniter assembly than the one depicted in FIG. 3. This acts like a "force accumulator" and absorbs force generated from the ignition exhaust, allowing for a smaller ignition charge to sever a given sized fuse. Alternately, if the optional projectile 34 is omitted, the enlarged impact area 38 can be employed to receive more of the output energy of the pyrotechnic igniter assembly 32 so that a larger igniter is not needed.

It has been determined that the embodiment of the invention described here can be configured to result in breakage of the circuit in about 0.1 to 5 ms, e.g., 1 ms, after issuance of a signal to pyrotechnic igniter assembly 32. Such a fast response time can help reduce the potential for buildup of heat in wiring and circuitry such as in a vehicle that has experienced a collision, prevent electrocutions, and stop fast-moving machinery or cutting apparatus or other abnormal condition such as in industrial safety systems.

If desired, electronic circuitry (not shown) may also be incorporated into the pyrotechnic circuit breaker 20, for example in applications where actuation of the igniter may require a secure digital signal for security or safety reasons, e.g., in the case of actuation by law enforcement or military personnel in the event of theft, pursuit, et cetera. If included, such circuitry could also be configured to monitor (based on, e.g., inductive field, temperature, or other desired means) the condition of the fuse itself to determine if a condition is present that warrants breaking the circuit. In such case, if suitable current-sensing means are employed, the portion of the circuit broken by the pyrotechnic igniter assembly need not be a fuse but instead can simply be an ordinary low resistance portion that is formed (e.g., by flattening, widening, and/or scoring) to be readily ablated or cut.

Although the foregoing description has described the action of the pyrotechnic igniter assembly as sufficient to fully ablate or cut the bolt-on fuse strip, other embodiments can readily be conceived in which the combination of heat, shock loading, and output gas pressure from the igniter breaks, weakens, or damages the fuse so as to decrease the amount of current required to sever the fuse (or cause it to break more rapidly at its rated current). It is also possible that the pyrotechnic igniter assembly can be used as the main actuator of the fuse in response to a command signal as well as in response to an excessive current load, such as by choosing a configuration and composition of the pyrotechnic igniter assembly whereby the igniter auto-ignites in response to heat generated by the fuse during excessive current load.

As will be readily apparent to one in the art, there are a number of applications in which suitable embodiments of a pyrotechnic circuit breaker according to the present invention may be employed. Considering just automotive applications by way of example, suitable embodiments may be used in an automobile to rapidly cut power in the case of a collision and thus reduce the risk of electrical fire or damage to electrical components. Circuitry generally similar to that used in safety system controllers could also be incorporated to monitor one or more conditions and when appropriate provide a command to the initiator to break the circuit, for example, a predetermined amount of time after the initial sensing of a collision. As another example, suitable embodiments of the present invention may be employed to disable an automobile (such as in response to a command transmitted by the owner, security service vendor, or government personnel) in the case of theft or unlawful operation of the vehicle. In such case, other measures known in the art may also be employed in conjunction so as to reduce the likelihood of immediate loss of control of the vehicle in response to such a command, et cetera. Another application is industrial equipment and personnel safety systems, such as safety curtains, emergency brakes for fast-moving rotary or linear machinery, cutting apparatus/blades, electrocution prevention, quick disconnects, et cetera.

Thus, although the present invention has been described in the context of one particular preferred embodiment, one skilled in the art will appreciate that numerous variations, modifications, and other applications are also within the scope of the present invention. For example, the present invention can be used in any suitable application in which there is a need for remote or automatic cutting of power in a rapid manner, such as in military or commercial vessels or aircraft (e.g., in case of enemy attack), commercial building power control panels and oil pipeline pumping stations (e.g., in an emergency such as an earthquake or terrorist attack), munitions or explosive devices (e.g., to disarm associated electronic circuitry), industrial safety curtains and high speed equipment (e.g., as a rapid power disconnect), and a number of other applications. Thus, the foregoing detailed description of preferred embodiments is not intended to in any way limit the invention, which is limited only by the following claims and their legal equivalents.

What is claimed is:

1. A pyrotechnic circuit breaker for use in an electrical circuit comprising:
    a) an electrically conductive portion including means for secure incorporation of the portion into the electrical circuit;
    b) a pyrotechnic igniter including an output end, said igniter secured so that said output end is oriented toward said electrically conductive portion;
    c) a passage between said output end of said pyrotechnic igniter and said electrically conductive portion;
    d) a rupture area adjacent said electrically conductive portion and on the opposite side of said electrically conductive portion from said pyrotechnic igniter output end;
    e) a housing formed of polymer; and,
    f) a projectile formed of polymer as an integral part of said housing, between said pyrotechnic igniter and said electrically conductive portion;
   wherein said electrically conductive portion is formed to be readily cut by said projectile.

2. The circuit breaker of claim 1, wherein said rupture area is defined in said housing.

3. The circuit breaker of claim 1, wherein said electrically conductive portion is a current load-based fuse.

4. The circuit breaker of claim 3, wherein said fuse is a bolt-on fuse strip.

5. The circuit breaker of claim 1, wherein said electrically conductive portion includes an enlarged impact area that is enlarged in a plane generally perpendicular to the output of said pyrotechnic igniter.

6. The circuit breaker of claim 1, wherein said electrically conductive portion includes an area that is flattened in a plane generally perpendicular to the output of said pyrotechnic igniter.

7. The circuit breaker of claim 6, wherein said electrically conductive portion is a current load-based fuse.

8. The circuit breaker of claim 6, wherein said electrically conductive portion has a periphery, and said rupture area has a perimeter selected so as to minimize the clearance between said rupture area and said electrically conductive portion.

9. The circuit breaker of claim 1, wherein said electrically conductive portion has a periphery, and said rupture area has a perimeter selected so as to minimize the clearance between said rupture area and said electrically conductive portion.

10. The circuit breaker of claim 1, wherein said electrically conductive portion is a fuse, said fuse having a first and second end, said means for secure incorporation including a portion at said first end of said fuss and a second portion at said second end of said fuse, said fuse being an integral single piece that has a uniform thickness throughout the distance between said first and second portions of maid means for secure incorporation.

11. A pyrotechnic circuit breaker for use in an electrical circuit comprising:
    a) an electrically conductive portion including means for secure incorporation of the portion into the electrical circuit, wherein said electrically conductive portion has an impact area;
    b) a pyrotechnic igniter including electrical leads and an output end, said igniter secured so that said output end is oriented toward said electrically conductive portion;
    c) a passage between said output end of said pyrotechnic igniter and said electrically conductive portion; and, d) a rupture area having a perimeter adjacent said electrically conductive portion and on the opposite side of said electrically conductive portion from said pyrotechnic igniter output end; and, e) means for breaking said electrically conductive portion using the output of said pyrotechnic igniter.

12. The circuit breaker of claim 11, wherein said electrically conductive portion in a current load-based fuse.

13. The circuit breaker of claim 12, wherein said fuse is a bolt-on fuse strip.

14. The circuit breaker of claim 11, wherein said electrically conductive portion has a narrowed region between said passage and said rupture area.

15. The circuit breaker of claim 11, wherein said means for breaking breaks said electrically conductive portion by using the output of said pyrotechnic igniter to propel a projectile into said electrically conductive portion.

16. The circuit breaker of claim 11, wherein said electrically conductive portion is a fuse, said fuse having a first and second end, said means for secure incorporation including a portion at said first end of said fuse and a second portion at said second end of said fuse, said fuse being an integral single piece that has a uniform thickness throughout the distance between said first and second portions of said means for secure incorporation.

* * * * *